Feb. 16, 1965 R. C. McDOWELL ETAL 3,169,269
SCRAPING APPARATUS FOR PELLETIZING PAN
Filed Aug. 6, 1962 8 Sheets-Sheet 1

INVENTORS.
ROBERT C. McDOWELL
THOMAS E. BAN
BY
Justin W. Macklin
ATTORNEY.

INVENTORS.
ROBERT C. McDOWELL
THOMAS E. BAN
BY
ATTORNEY.

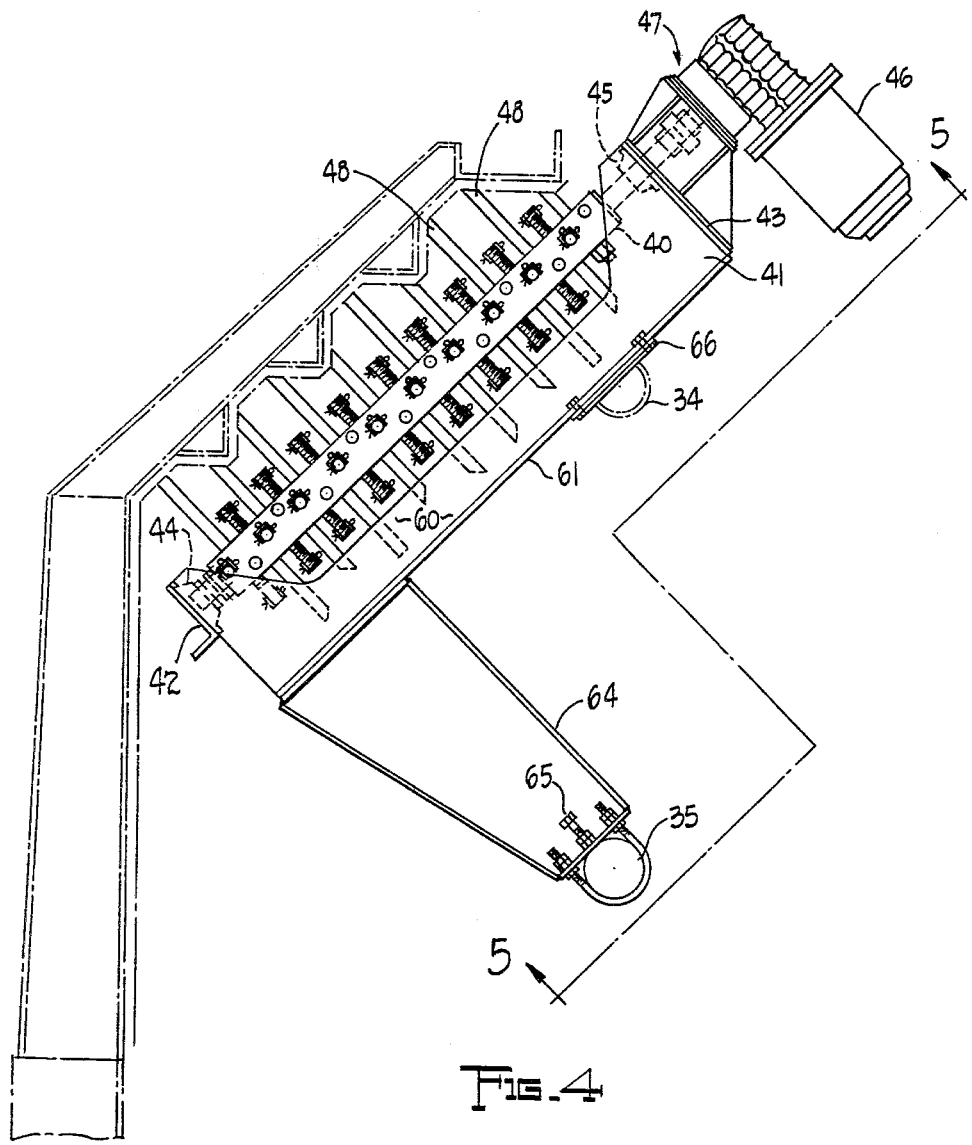

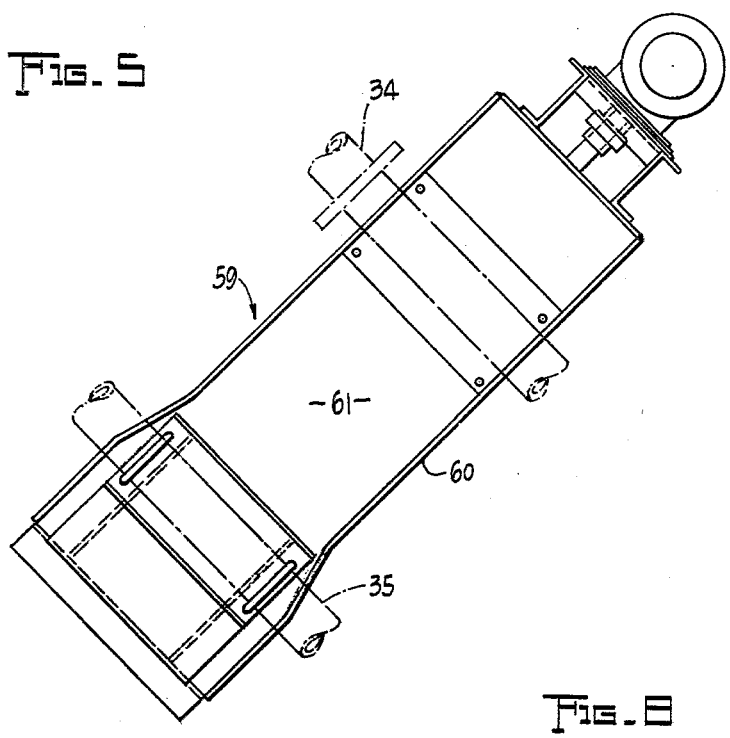
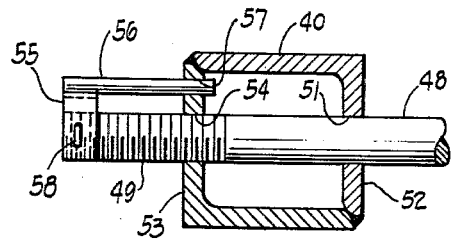
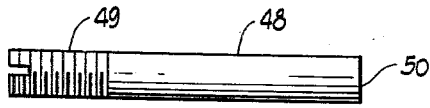
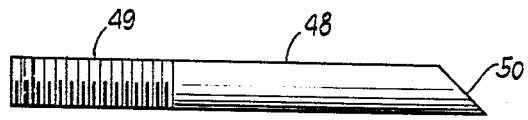

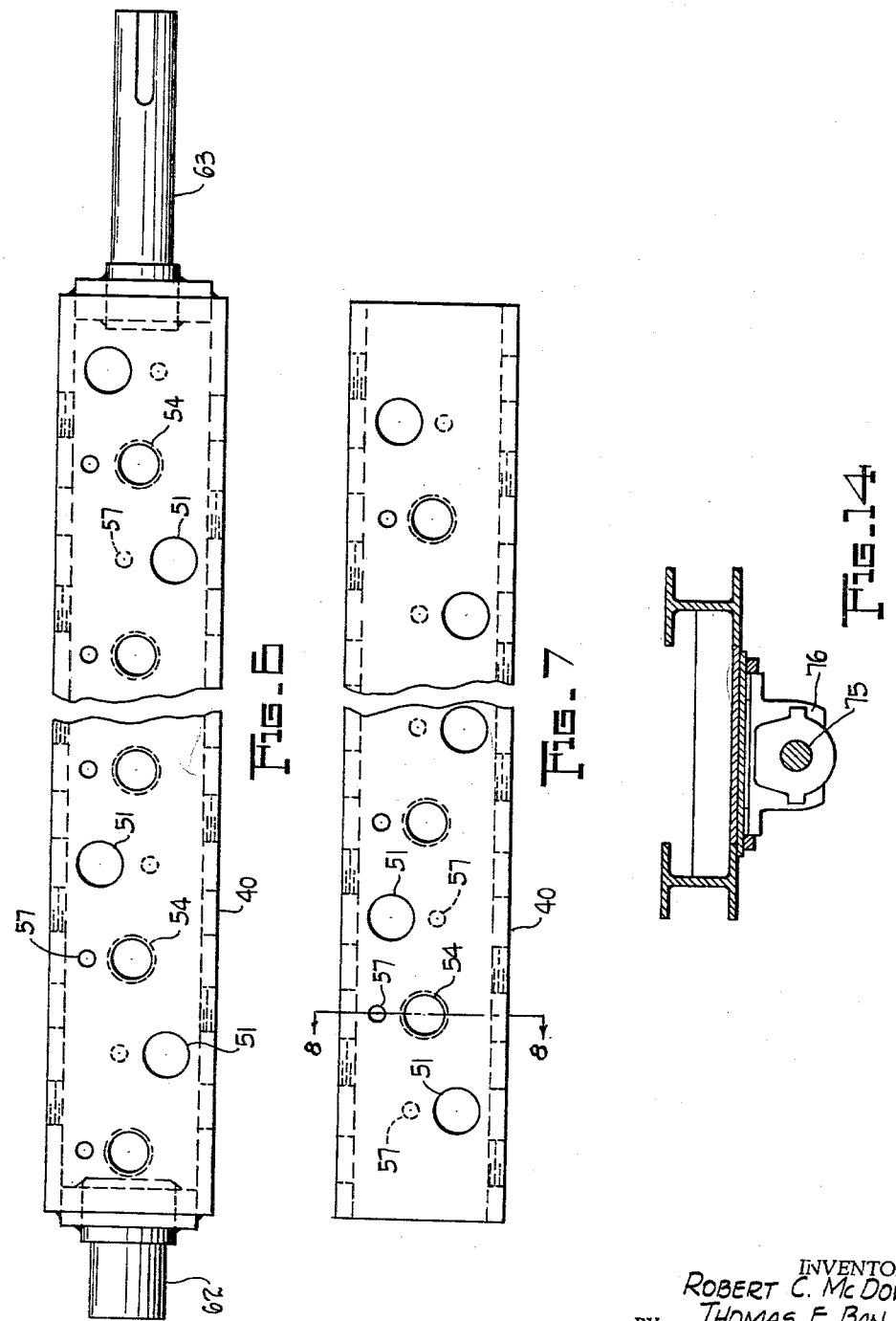

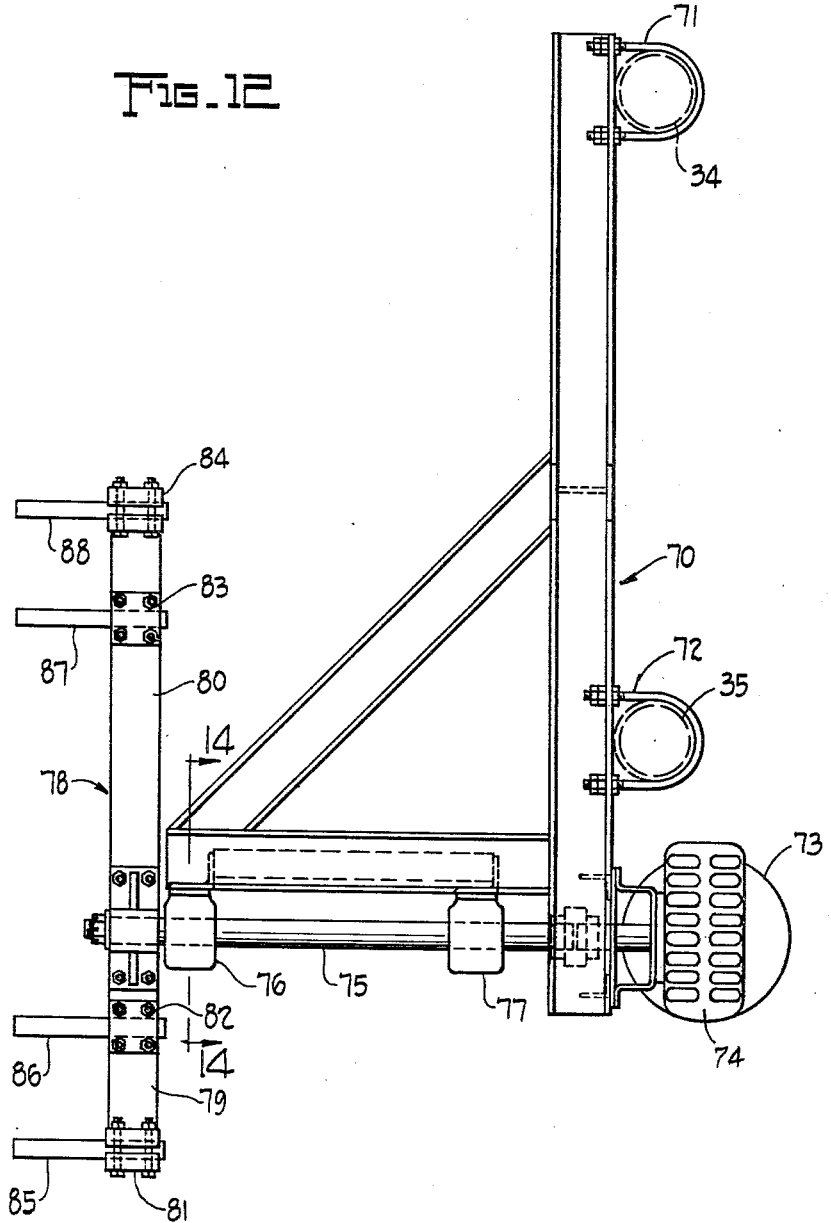

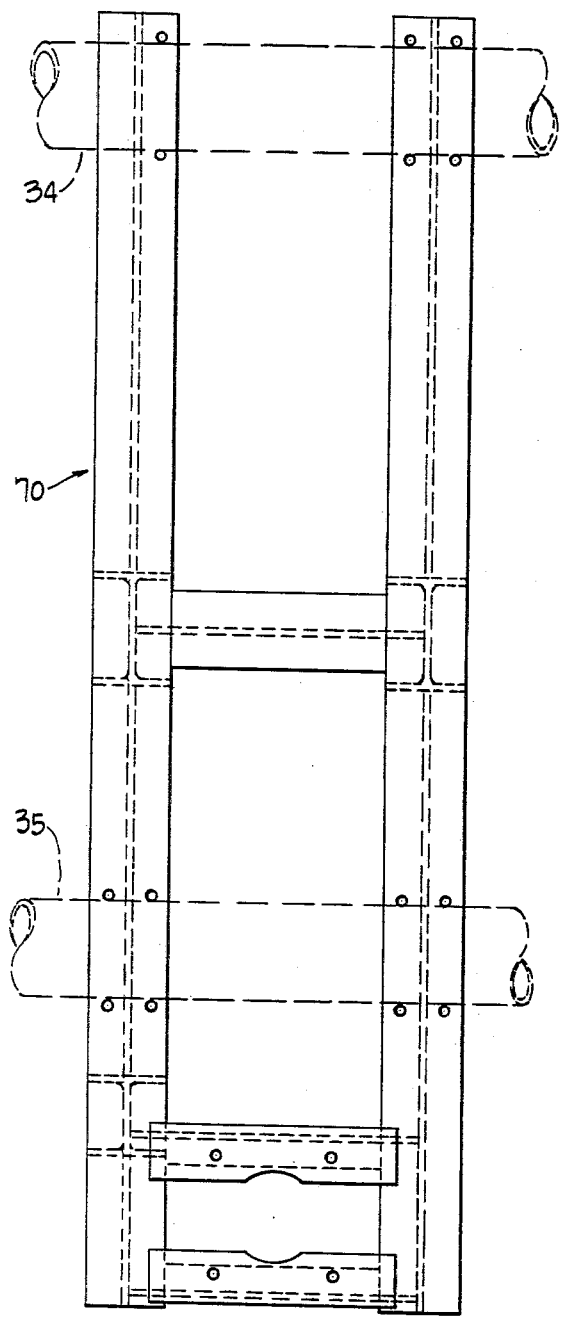

United States Patent Office 3,169,269
Patented Feb. 16, 1965

3,169,269
SCRAPING APPARATUS FOR PELLETIZING PAN
Robert C. McDowell, Cleveland, and Thomas E. Ban, Cleveland Heights, Ohio, assignors, by mesne assignments, to McDowell-Wellman Engineering Company
Filed Aug. 6, 1962, Ser. No. 215,136
10 Claims. (Cl. 18—1)

This invention relates, as indicated, to apparatus for pelletizing or agglomerating materials, or the preparation of nodular mixtures, and especially apparatus for pelletizing pulverized iron ore compositions. More particularly, the invention relates to improved apparatus for preventing undue accretion of material on the operating surfaces of pelletizing apparatus. While this invention is applicable to pellet or nodule forming, and mixing apparatus of the rotary drum or pan types, it will be illustrated in reference to pelletizing pans of the types in use for forming pellets of various iron ore containing compositions, especially moistened ore aggregates.

Pelletizing devices depending upon a rotating inclined conical, cylindrical, or combined conical-cylindrical section and especially those, the inner surface of which is characterized by a plurality of flights radially and axially disposed at successively increasing distances from the base of the vessel, are old. Heretofore, accretion of the material on the side wall or rim surface of the vessel has been controlled by means of a stationary scraper adapted to conform in its profile to the profile of this portion of the vessel. Accretion of material on the bottom surface of the pelletizing device has been controlled in the past by rotating means, numerous examples of which are known to those skilled in the art.

A principal problem with the stationary side wall scraping apparatus has been that from time to time, chunks of the paste mixture would be broken off by the scraper and fall to the pelletizing portion of the apparatus with the resultant formation of greatly oversized pellets which must be separated from those of the desired size. A substantial portion of the material charged to the pelletizing vessel, then, would require separation and possibly re-working in order to avoid unnecessary loss of material. The removal of such chunks of material by a gouging action of the stationary scraper would also destroy the carefully built up surface coating of the material being balled or pelletized with resultant impairment of efficiency.

The present invention now provides a scraping apparatus which coacts with the surface or rim of the pelletizing apparatus to control the extent of accretion of material on the surface, and at the same time avoid the formation of large conglomerates of such material and the attendant formation of improperly sized pellets. Essentially, the accretion controlling apparatus of the present invention is characterized by having a rotatable shaft disposed in spaced relation to the rim surface and a plurality of material engaging members disposed in axially spaced and outwardly projecting relation along said shaft for rotation therewith, the length of the projecting members at progressively longitudinal positions on the shaft being adapted to conform with the profile of the pelletizing surface.

In a preferred embodiment, the projecting material engaging members comprise a plurality of projecting fingers radially protruding from the rotatable shaft at 90° intervals and at progressive longitudinal positions on the rotating shaft. The extent of projection of the respective fingers from sequentially axially disposed right angularly related positions forms at the combined outer extremities a profile which conforms with the profile of the pelletizing rimmed surface. The displacement of the profile cut by the material engaging members from the substrate surface of the pelletizing pan is adjustable. In operation, the individual scraping fingers contacting the coated surface cause the surface to become roughened or "fractionized" for improved mixing and pelletizing over the relatively smoother surface resulting when stationary scrapers are used and are operating properly.

The profile maintained by the scraping apparatus hereof may be right cylindrical, conical, spherical, stepped, or any combination of these. For illustrative purposes, a profile of a flaring or conical side wall having a plurality of steps or troughs disposed on the inner surface thereof will be used, it being understood that the present apparatus is adaptable to provide any desired profile.

Other objects of the invention will appear as the description proceeds.

Through the accomplishment of the foregoing and related ends, said invention, then, consists of the means hereinafter fully described and particularly pointed out in the appended claims, the following description setting forth in detail certain illustrative embodiments of the invention, such disclosed means constituting, however, but a few of the various forms in which the principle of this invention may be employed.

Briefly stated, then, the present invention comprises in combination a mixing or pelletizing apparatus having a material receiving vessel mounted for rotation on an inclined axis, said vessel having a base and a side wall extending therefrom, and a mechanism coacting therewith to comminute and maintain a predetermined level of charged material along the side wall including a frame overlying the vessel, and a shaft rotatably journalled in the frame with its axis disposed in spaced relation to the side wall of the vessel. A plurality of material engaging members are disposed in axially spaced and outwardly projecting relation along the shaft for rotation therewith, the axial length of the projecting members along the shaft being adapted to conform with the profile of the side wall surface. Means are also provided for rotating the shaft in conjunction with the rotation of the vessel.

In the annexed drawings:

FIG. 4 is a side elevation of the pan rim or vessel rim scraping unit on enlarged scale;

FIG. 5 is a bottom elevation of the rim scraping unit shown in FIG. 4;

FIGS. 6 and 7 are detailed side and top elevations, respectively, on an enlarged scale of a rotatable bar for supporting a plurality of scraping fingers for the rim scraping unit;

FIG. 8 is a cross-sectional view taken on the plane indicated by the line 8—8 of FIG. 7 showing a preferred mode attachment of the scraping fingers;

FIG. 9 is an end view of the scraping finger attachment assembly shown in FIG. 8;

FIGS. 10 and 11 are elevations of scraping fingers;

FIG. 12 is a side elevation on an enlarged scale of a pan bottom scraping unit and supporting frame;

FIG. 13 is an elevation of the bottom scraper supporting frame shown in FIG. 12;

FIG. 14 is a cross-sectional view in the plane indicated by the line 14—14 of FIG. 12; and FIG. 15 is a bottom elevation of a rotatable bar for supporting a plurality of scraping fingers for the bottom scraping unit.

Figure 1:
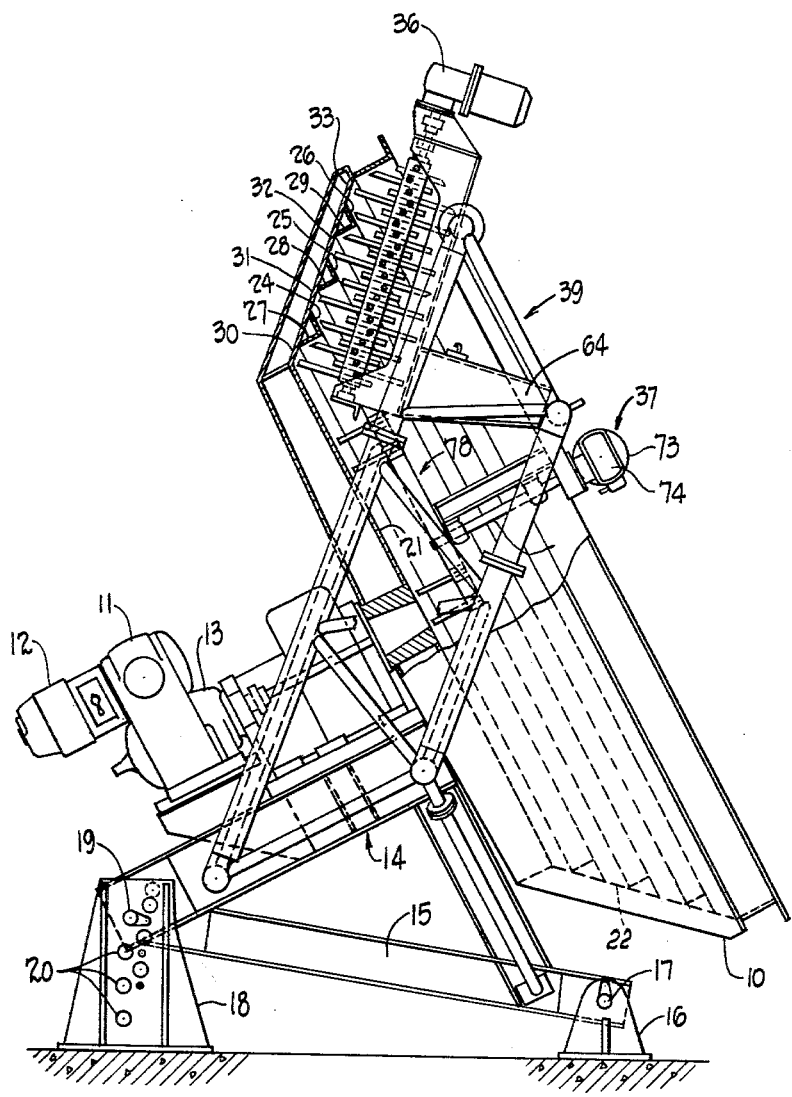
FIG. 1 is a partially cut-away side elevation of a pelletizing apparatus and showing side and bottom surface scraping units.
Figure 2:
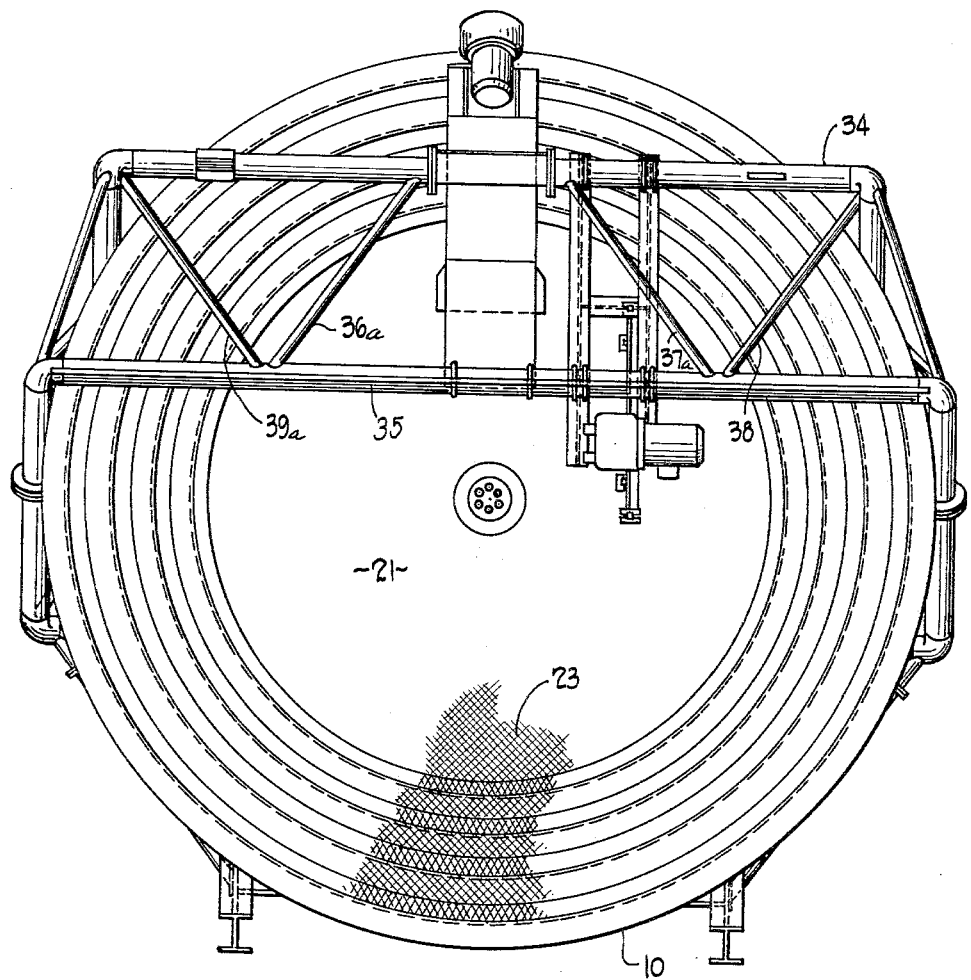
FIG. 2 is a front elevation of the apparatus shown in FIG. 1.
Figure 3:
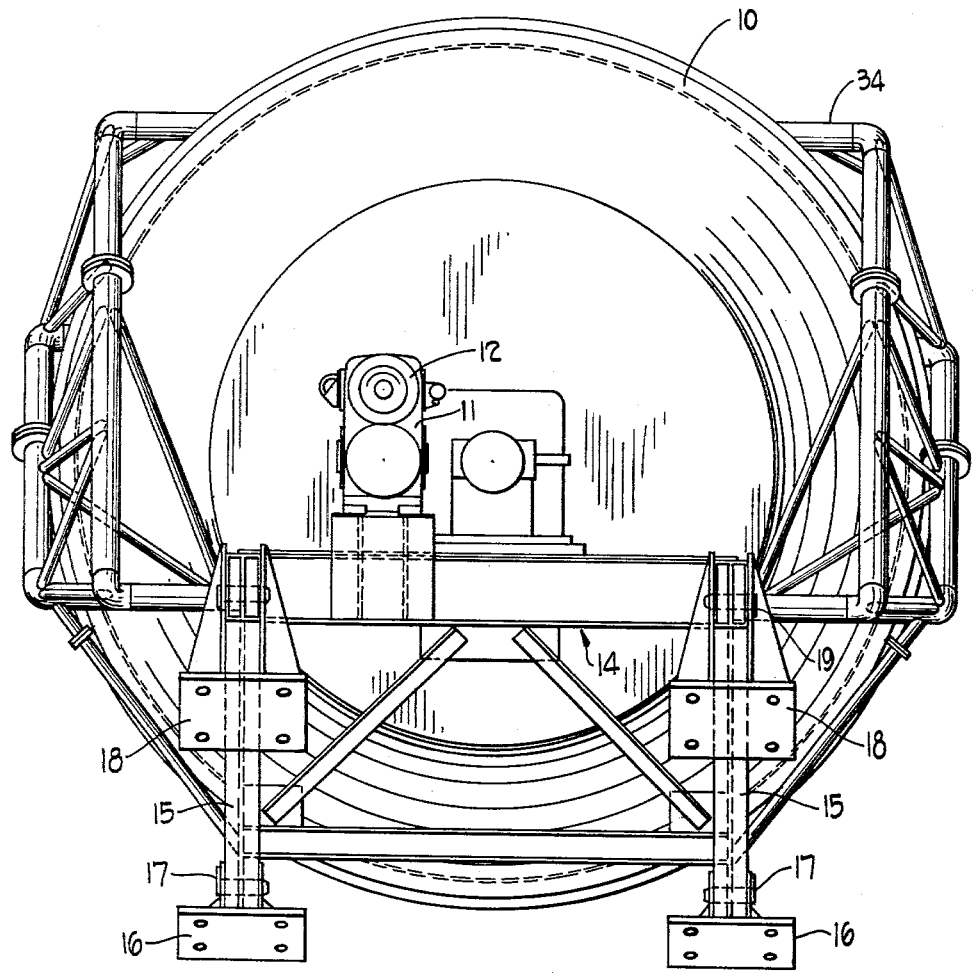
FIG. 3 is a rear view of the apparatus of FIG. 1 showing drive motor and scraper unit supporting framework.

Referring now more particularly to FIGS. 1, 2 and 3, there is here shown a pelletizing apparatus of the rotating disk type having a material receiving vessel 10 mounted for rotation on an inclined axis. Because of the size to which devices illustrative of the present invention may be constructed, e.g. 18 feet in diameter, the construction of the pan or pelletizing vessel 10 is conveniently of the double wall type such as shown in FIG. 1. Driving means 11, including suitable motor 12 and gear reduction means 13, are mounted on a suitable frame 14. Frame 14 is adapted to vary the angle of inclination of the motor and gear reducing elements and is accordingly conveniently adjustable to a number of predetermined positions. In the apparatus shown in FIGS. 1–3, legs 15 which are parts of frame 14 are rotatably anchored in anchor 16 by means of pin 17.

The opposite extremity of leg 15 is perforated and coacts with perforated support 18 through a pin 19 to adjust and secure the angle of inclination of the axis of pan 10, support 18 being provided with a plurality of pin receiving holes 20 to enable such adjustment. The support and drive means for the pelletizing apparatus form no part of the present invention.

The inner surface of the pan 10 is composed of a bottom or base 21 and a flaring side wall or rim 22. As shown in FIG. 2, there is conveniently provided in overlying relationship with the rim and bottom surfaces, an expanded metal liner 23 covering in surface-contour conforming adjacent relationship therewith. The function of such liner is to aid the formation and retention of a relatively thick coating of pelletizable material on the bottom and rim surfaces of the pan 10. Other means for causing adhesion of a layer of material being pelletized, or other compatible material, e.g. bentonite, to the operative surfaces of the pelletizing pan or vessel may, of course, be employed.

In the embodiment shown in FIGS. 1–3, the flaring side wall 22 is desirably provided with a plurality of annular surfaces, such as annular surfaces 24, 25 and 26, disposed in planes which are parallel to the base of the vessel at successively increasing distances from the base along said side wall 22. Each annular surface 24, 25 and 26 is provided with an axially directed depending portion or flange 27, 28 and 29, respectively. Flanges 27, 28 and 29 all intersect the outwardly flaring side wall 22, and as shown in FIG. 1 are preferably in spaced relation from the next annular surface, i.e. exposing side wall portions 30, 31, 32 and 33, respectively. The combination, then, of the annular surface, e.g. annular surface 24, with flange portion, for example, flange 28 and, where present, side wall portion 31, form a trough in which the pelletizing operation or a portion thereof occurs. In the apparatus shown in FIG. 1, for example, a series of four such pelletizing troughs are provided at successively increasing radial and axial distances from the base 21.

In FIG. 1 rim scraping apparatus, generally indicated at 36, and bottom scraping apparatus, generally indicated at 37, are shown in operative position. These mechanisms will be described in greater detail subsequently.

Scraping mechanisms 36 and 37 are supported on a frame generally indicated at 39, which frame is in pan overlying relation nad is supported by motor frame 14. While any suitable scraper supporting frame structure may be employed for the purpose of disposing the scrapers in proper operating position with respect to the pan surfaces, the frame 39, as shown in FIGS. 1 to 3, is a preferred structure.

Frame 39, as shown best in FIG. 2, includes a pair of parallel, horizontally disposed bars; namely, upper bar 34 and lower bar 35 disposed in overlying relationship across the open, or material receiving mouth of the pan 10. Suitable compression and tension bracing members 36a, 37a, 38, 39a are conveniently provided to improve the rigidity of the scraper supporting frame, thereby improving the uniformity of action of the scraping fingers on the surfaces controlled thereby.

The exact form of the scraper supporting mechanism or frame is not critical, and indeed, in some instances, it may be desirable to suspend the frame for supporting the scrapers from a structure independent of the pelletizing apparatus itself. However, for ease of installation and stability with respect to motions to which the pelletizing pan itself may be submitted, the structure which is shown in FIGS. 1–3 is preferred.

FIGS. 4–9, inclusive, illustrate details on an enlarged scale, of a preferred form of rim scraping apparatus in accordance with the present invention. FIGS. 10 and 11 are elevations of material engaging fingers typical of those used in the scraping apparatus hereof. The rim scraping apparatus 37 includes a shaft 40 journalled for rotation, and preferably supported in a cradle carried by the frame bars 34 and 35 (FIG. 2). Cradle or channel 41 is generally of box-like construction having end walls 42 and 43, respectively, and having mounted thereon bearings 44 and 45 in which the shaft 40 is journalled for rotation.

Upstanding side walls 59 and 60 of cradle 41 coact with the bottom 61 to provide a collector or guard for the material centrifugally discharged from the fingers. Means may be provided, if desired, for returning such material to the pan for re-working, e.g. vibratory means. Cradle supporting leg 64 is secured to the bottom 61 and extends laterally therefrom for engagement with frame bar 35. Jack screw 65 coacting between the leg 64 and the bar 35 enables adjustment of the spacing between the distal fingers 48 and the rim or side wall 22. Spacing of the proximal fingers, i.e. those near the drive motor 46, from the side wall 22 is accomplished by interposing shims 66 between the bottom 61 of cradle 41 and frame bar 34.

Shaft 40, as shown in FIG. 8, is preferably of square cross-section, such as formed by welding together the free marginal edges of a pair of right angle iron members. Shaft 40 has a length which is sufficient to span the width of the flaring portion or rim portion 22 of the pelletizing apparatus, when disposed parallel to and in a plane normal to the surface.

As indicated above, shaft 40 is provided at its opposite ends with journals 62 and 63 which are mounted in bearings 44 and 45 secured to the end walls 42 and 43 of the cradle 41, and which in turn is supported by overlying frame bars 34 and 35, respectively. Motor 46 is connected through suitable gear reduction and clutch means, generally indicated at 47, to impart rotatory motion to the shaft 40. It should be noted at this point that in the preferred embodiment, the direction of rotation of the scraping fingers is counter to that of the pelletizing bowl. Thus, where the pelletizing bowl 10 is rotating in a clockwise direction, as shown in FIG. 2, the direction of rotation of the scraping device will be counter-clockwise. Speed of rotation of the rim scraper is conveniently from about 60 to about 90 r.p.m., whereas the speed of rotation of an 18 foot diameter bowl is about 6–12 r.p.m.

The scraper is characterized by a plurality of radially extending material engaging fingers or bars 48 secured to the shaft 40 for rotation therewith. The fingers 48 are so positioned and disposed along shaft 40, and are provided with such diverse lengths of radial projection from shaft 40 that when the shaft 40 is rotated, the outer extremities of the projecting fingers 48 trace a profile which corresponds to the profile of the flaring rim portion or side wall 22. As shown in FIGS. 10 and 11, which are typical examples of material engaging fingers 48, these are conveniently cylindrical bars threaded at one extremity 49 for adjustable retention in rotor 40. The opposite extremity 50 is contoured to correspond to the contour of the side wall portion 22. The length of the finger 48 will, of course, vary with the displacement of the side wall surface from the center line of rotor 40 which, as indicated above, is disposed parallel to the side wall 22. Bars 48 are conveniently made from tool steel heat treated to harden the steel. The degree of hardness will depend on the abrasiveness of the material contacted by the fingers. For some purposes, it is desirable to provide the fingers with high rake and relief angles in such manner that they are essentially self sharpening. It may also be found desirable to reinforce the material engaging tips with very hard tool steel.

FIGS. 6 to 8, then, show in greater detail the structure of rotor 40 and the position of the holes 51 and tapped holes 54 for retaining the fingers 48. Thus, there are provided, for example on one surface, for example the surface shown in FIG. 6, holes 51 in staggered relation to each other progressively in an axial direction. The hole 51 extends through the parallel opposed surfaces 52 and 53 (FIG. 8), for example, each finger passing completely through the rotor 40 for more rigid support thereof. Thus, the opening provided in surface 52 is a drilled hole 51, and its coacting bore in the opposite surface 53 is a tapped hole 54 for threaded engagement with the threaded portion 49 of a material engaging finger 48. FIG. 8 is a typical section through all holes in the rotor 40.

In order to lock the fingers 48 into position, there may be provided, as shown in FIG. 8, a clevis 55 welded to a keying bar 56 which is adapted to be received in a small bore 57 in the face of shaft 40 and adjacent each threaded hole 54. The side arms of the clevis 55 are adapted to receive a cotter pin 58 which extends through the bar 48 and prevents rotation thereof, which rotation would result in changing the lateral projecting distance of the finger 48 from the rotor or shaft 40. The fingers 48 undergo wear during operation and by removing the cotter pin 58, it then becomes possible to adjust the lateral projecting distance of the fingers 48 as may be required.

In the preferred embodiment shown in the drawings, the disposition of the scraping fingers 48 is such that successive fingers 48 axially of the shaft 40 are at right angles to each other, and a line passing through the center lines of each successive finger, a fixed distance from the axis of shaft 40 and toward the scraping end of the finger describes a helix surrounding the shaft 40. Depending on the size and configuration of the pelletizing pan, the successive fingers 48 may bear angular relations to each other different from 90°, which is preferred, e.g. 45°, 60°, 120°, 180°. The width and terminal configuration of each finger is such that the profile traced during rotation by the series of fingers is continuous at the pelletizing surface of the rim and follows the contour thereof.

When rotated by motor 46, the fingers successively engage the material building up on the surface and rasp or comminute it to form smaller particles which are returned for re-working. The rim scraping apparatus is preferably located at the "12:00 o'clock" position at which point it will not interfere with the normal pelletizing operation. The latter occurs chiefly in the region of the lower left hand quadrant for clockwise rotation of the pan, and in the lower right hand quadrant for counterclockwise rotation. Thus, in either case, the rim scraper is located beyond the point in the vessel where pelletizing is occurring. This point, or angular disposition, will vary with the amount of inclination of the pan axis.

Undesirable build-up of material on the bottom of the pan is prevented by separate scraping apparatus, and FIGS. 12 to 15 show details of a bottom scraping apparatus which coacts with the rim scraping apparatus to maintain a predetermined thickness of material on the pelletizing pan surface. There is shown a bottom scraper supporting frame 70 adapted to be supported also on upper bar 34 and lower bar 35 and anchored thereto by any suitable means, e.g. U-bolts 71 and 72. Motor 73 mounted on support frame 70 is coupled through any suitable gear reduction device 74 to shaft 75. Shaft 75 is mounted for rotation in pillow blocks 76 and 77 also carried by frame 70, and in a plane normal to the bottom 21 of the pelletizing pan.

Shaft 75 has secured to its free end, as for example by key 75a, a scraper bar holder arm 78 for rotation therewith in a plane parallel to the bottom 21. The point of attachment of the shaft 75 to the arm 78 is desirably such that the radial portions of the arm 78 are of different lengths to provide maximum surface coverage as a result of the combined rotation of the pelletizing pan and the scraper arm. In the structure shown in FIGS. 12 and 15, portion 79 is one half as long as portion 80.

Scraper bar holder arm 78 is provided at each of its ends with a plurality of clamps, e.g. clamps 81, 82, 83 and 84, adapted to receive and retain scraper bars, e.g. bars 85, 86, 87 and 88, respectively. Bars 85, 86, 87 and 88 are conveniently tool steel bars of rectangular cross-section heat treated to provide a hard surface.

In the preferred embodiment shown in the drawings, the bottom scraping apparatus is mounted and the holder arm 78 proportioned so that the circle described by the major arm portion 80 passes over the center of the pelletizing pan bottom 21 and over the circumference of the bottom 21. The speed of rotation is desirably from about 60 to 90 r.p.m. as with the rim scraper when operating in an 18 foot diameter bowl revolving at 6 to 12 r.p.m.

In operation, a mixture of iron ore with water (12% $H_2O$ approximately) is charged to the pelletizing pan, for example by a belt conveyor. The rotation of the pan causes the moist material to roll over the rough bottom and rim surfaces. Initially, the action is to prepare a tractionized and pan protecting surface of damp ore mixture coating the entire pan surface including the bottom and rim surfaces. Pellets are formed in the usual manner, but the build-up of material on the surfaces continues. At a predetermined level of build-up, e.g. 1" from the pan surface, the scrapers become effective in removing any further accretion of pelletizing material and providing a roughened or tractionized surface. With the rim scraper device of the parent invention, no large chunks of slurry are formed which result in greatly oversized pellets and uniformity of the pelletized product is improved thereby. The bottom scraping apparatus coacts with the rim scraper to maintain a uniform layer of material adhering to the entire pan surface.

Other modes of applying the principle of this invention may be employed instead of those specifically set forth above, changes being made as regards the details herein disclosed provided the elements set forth in any of the following claims, or the equivalent of such be employed.

It is, therefore, particularly pointed out and distinctly claimed as the invention:

1. In combination, a material receiving vessel mounted for rotation on an inclined axis, said vessel having a base and a side wall extending therefrom, and a scraping mechanism coacting therewith to maintain a predetermined thickness of charged material on the side wall beyond a predetermined angular disposition of said vessel, including a frame disposed in spaced overlying relation beyond said predetermined angular disposition of said vessel, a shaft rotatably journalled in said frame and having its axis disposed in overlying spaced relation to the side wall of said vessel, a plurality of material engaging members disposed in axially spaced, outwardly projecting relation along said shaft for rotation therewith, said members having individual lengths adapted to conform to the profile of said side wall of said vessel, and means for rotating said shaft.

2. In combination, a material receiving vessel mounted for rotation on an inclined axis, said vessel having a base and an outwardly flaring side wall having a plurality of annular pelletizing troughs formed therealong at successively increasing radial and axial distances from said base, and a scraping mechanism coacting therewith to maintain a predetermined thickness of charged material on the side wall beyond a predetermined angular disposition of said vessel, including a frame disposed in spaced overlying relation beyond said predetermined angular disposition of said vessel, a shaft rotatably journalled in said frame and having its axis disposed in overlying spaced parallel relation to the outwardly flaring side wall of said vessel, a plurality of material engaging members disposed in axially spaced, outwardly projecting relation along said shaft for rotation therewith, said members varying in length to conform to the profile of the plurality of troughs formed on the side wall of said vessel, and means for rotating said shaft.

3. In combination, a material receiving vessel mounted for rotation on an inclined axis, said vessel having a base on an outwardly flaring side wall having a plurality of annular surfaces disposed in planes parallel to the base of said vessel at successively increasing distances from the base along said side wall, each annular surface having an axially dependent portion intersecting the outwardly flaring side wall in spaced relation from the next annular surface to form a plurality of pelletizing troughs at successively increasing radial and axial distances from said base, a scraping mechanism coacting therewith to maintain a predetermined thickness of charged material on the side wall, including a frame disposed in spaced relation overlying the vessel, a shaft rotatably journalled in said frame with its axis disposed in spaced parallel relation to the outwardly flaring side wall of the vessel, a plurality of material engaging members disposed in axially spaced and outwardly projecting relation, along said shaft, for rotation therewith, said members varying in length to conform to the profile of the plurality of troughs formed on the side wall of said vessel, and means for rotating said shaft.

4. The combination of claim 3 in which successive material engaging members are disposed at right angles to each other.

5. The combination of claim 3 in which each of said material engaging members is a cylindrical bar including means coacting with said shaft for securing the member in fixed relation with said shaft.

6. The combination of claim 3 in which said shaft is a tubular member of rectangular cross-section.

7. The combination of claim 6 in which each material engaging member is a cylindrical bar traversing both parallel opposed surfaces of said rectangular shaft.

8. The combination of claim 7 in which coaxial bar-receiving holes are provided in each face for each said bar, at least one of which is adapted for threaded engagement with said bar.

9. The combination of claim 8 including releasable means for preventing rotation of each said bar.

10. The combination of claim 9 in which the bars are so disposed about said shaft that a line passing through the center line of each successive bar a given distance toward the material engaging extremity thereof describes a helical form about said shaft.

References Cited by the Examiner
UNITED STATES PATENTS

| | | | |
|---|---|---|---|
| 1,980,130 | 11/34 | Fasting | 18—1 |
| 2,550,802 | 5/51 | Gholson | 18—1 |
| 2,923,965 | 2/60 | Djuvik | 18—1 |
| 2,947,026 | 8/60 | De Vaney | 18—1 |
| 3,010,145 | 11/61 | Rolfson | 18—1 |

WILLIAM J. STEPHENSON, *Primary Examiner.*